(12) United States Patent
Ursel

(10) Patent No.: US 7,392,910 B2
(45) Date of Patent: Jul. 1, 2008

(54) LAMELLAR DECANTING MODULE AND BLOCK COMPRISING PLATES THAT CAN BE VERTICAL

(75) Inventor: Valery Ursel, Saint-Maurice (FR)

(73) Assignee: OTV S.A., Saint-Maurice (FR)

( * ) Notice: Subject to any disclaimer, the term of this patent is extended or adjusted under 35 U.S.C. 154(b) by 0 days.

(21) Appl. No.: 10/568,877

(22) PCT Filed: Aug. 16, 2004

(86) PCT No.: PCT/FR2004/002147

§ 371 (c)(1),
(2), (4) Date: Feb. 21, 2006

(87) PCT Pub. No.: WO2005/018774

PCT Pub. Date: Mar. 3, 2005

(65) Prior Publication Data

US 2006/0261006 A1 Nov. 23, 2006

(30) Foreign Application Priority Data

Aug. 19, 2003 (FR) .................................. 03 10019

(51) Int. Cl.
*B01D 21/02* (2006.01)
(52) U.S. Cl. .................. 210/521; 210/522; 210/541
(58) Field of Classification Search ................ 210/521, 210/522, 541, 802, 532.1, DIG. 5, 232, 150, 210/151
See application file for complete search history.

(56) References Cited

U.S. PATENT DOCUMENTS

| | | | | |
|---|---|---|---|---|
| 3,399,135 A | | 8/1968 | Rice et al. | |
| 3,491,892 A | * | 1/1970 | McCann | 210/521 |
| 3,852,199 A | * | 12/1974 | Wachsmuth et al. | 210/522 |
| 4,122,017 A | * | 10/1978 | Tanabe et al. | 210/522 |
| 4,305,819 A | * | 12/1981 | Kobozev et al. | 210/521 |
| 4,346,005 A | * | 8/1982 | Zimmerman | 210/521 |
| 4,929,349 A | * | 5/1990 | Beckman | 210/521 |
| 4,933,524 A | | 6/1990 | Meurer | |
| 5,017,294 A | * | 5/1991 | Durrieu | 210/DIG. 5 |
| 5,217,614 A | * | 6/1993 | Meurer | 210/521 |
| 5,545,327 A | * | 8/1996 | Volland | 210/151 |
| 5,736,037 A | | 4/1998 | Meurer | |
| 5,779,895 A | * | 7/1998 | Biskner et al. | 210/521 |
| 6,171,483 B1 | | 1/2001 | Eden et al. | |
| 6,605,224 B2 | * | 8/2003 | Aymong | 210/DIG. 5 |

FOREIGN PATENT DOCUMENTS

EP 0 423 964 A1 4/1991
FR 2 348 156 A 11/1977

* cited by examiner

*Primary Examiner*—Christopher Upton
(74) *Attorney, Agent, or Firm*—Browdy and Neimark

(57) ABSTRACT

The invention relates to a lamellar decanting module comprising two interconnected plates, at least one of said plates being corrugated in such a way that the dips and peaks are inclined in relation to a first edge of said plate according to a non-zero degree angle and define inclined decanting tubes with the other plate. Said module is characterised in that the two plates (2, 3) have the same corrugated profile and are interconnected in connection regions defining a plane of symmetry (P) for the tubes (4) defined by said plates. A plurality of modules can be assembled in such a way as to form a block in which the plates are parallel to one of the faces.

25 Claims, 4 Drawing Sheets

LAMELLAR DECANTING MODULE AND BLOCK COMPRISING PLATES THAT CAN BE VERTICAL

I—TECHNICAL FIELD

The invention relates to a system of slats for separating by sedimentation solid particles in suspension in liquids such as effluents, in particular a system well adapted to the clarification of waste waters, rendering surface waters drinkable and the production of industrial process effluents.

II—TERMINOLOGY

Diverse concepts will be used hereinafter with the following meanings:
- Sedimentation plate or slat=plane or corrugated surface installed in a tank called a lamellar sedimentation tank to recover particles detached from the main fluid,
- Sedimentation tube=conduit of essentially polygonal shape, generally formed by the juxtaposition of two plates at least one of which is corrugated, and disposed at a certain angle relative to the horizontal plane to effect the liquid-solid separation,
- Module=group of two plates disposed to constitute sedimentation tubes,
- Block=group comprising a plurality of assembled modules to facilitate use,
- Transition area=first portion of the sedimentation tube in which the transition between turbulent flow and laminar flow occurs,
- Useful length=portion of the sedimentation tube situated downstream of the transition area, in which phase separation occurs because of laminar flow conditions.

III—PRIOR ART

Existing lamellar sedimentation tank employ one of the following three flow principles:
- counter-current: the particles move downwards while the liquid being treated moves upward,
- cross-current: the liquid moves horizontally while the particles move downward,
- co-current: the liquid and the separated particles flow in the same direction, generally downward.

The invention is aimed particularly at the first category, namely counter-current sedimentation, which is that most widely used in industry.

Most existing systems (often referred to as of the "honeycomb" type) are based on the use of separator tubes, which are usually polygonal, oriented at an angle from 45° to 65° to the horizontal plane.

In practice, the plates used have a waffle pattern, usually of trapezoidal shape, disposed parallel to the vertical edge of the plates, and the inclination of the tubes formed in this way is determined by the angle at which the plates are mounted relative to the horizontal plane, i.e. an angle from 45° to 65°.

Inside the tubes, which are of hexagonal shape when the waffle pattern is trapezoidal, the sludge flows over the inclined plane formed by the lower side of the hexagon (and thus a shorter side of the trapezoidal shape), at a speed that is slowed by friction resulting from the large area of contact between the sludge and the slats because of this trapezoidal section.

Moreover, the plates disposed this way run the risk of buckling and of plastic deformation if the weight of the deposit becomes excessive, which in practice necessitates the presence of specific stiffening arrangements or an increased thickness of the plate.

Thus prior art lamellar sedimentation tanks consist in practice of a stack of parallel plates (in the lengthwise direction of the tank) offset relative to each other to take account of their inclination and forming a long assembly necessitating handling, relative positioning and stacking of a large number of inclined plates. Assembling the plates into modules and the modules into blocks facilitates the use of these plates by virtue of a portion of the assembly operations being carried out outside the tank; however, there are still operations to be carried out in the tank, which significantly increases the cost and the duration of which is difficult to reduce.

Moreover the blocks, which have the shape of non-rectangular parallelograms with inclined lateral faces consisting of the front and rear plates, are difficult to handle and ill-adapted to equipping structures of non-rectangular shape.

Another type of commercially available lamellar block is of parallelepipedal shape, consisting of vertical plates carrying waffle patterns inclined relative to the sides of the plates; blocks of this kind are routinely used as an orderly lining to increase the area of contact in gas-liquid and liquid-liquid contact devices. However, in this type of use, the successive plates are disposed so that the waffle patterns are crossed, to enhance the effect of mixing by crossing of the flows, with the result that there are not really any tubes.

A variant is disclosed in the document U.S. Pat. No. 5,384,178, which describes a sedimentation assembly formed of modules of two vertical plates conjointly forming inclined tubes. To be more precise, each module is formed by assembling two plates with different geometries, the first of which is corrugated and the other substantially plane, so that the tubes have trapezoidal, almost triangular, sections. To be more precise, the second plate has concave grooves that cap the crests of the other plates, which enables good relative positioning, but implies that the second plate penetrates into the concave portions of the corrugations of the first plate. These modules can be stacked, thus forming an array of substantially triangular tubes. However, because these plates have corrugations in the same direction but of different amplitudes, the tubes obtained by stacking two modules are smaller than those formed within each of the modules. The corrugations are not rectilinear in the sense that, at their ends, the tubes are bent until they are vertical and moreover because the walls of the tubes have corrugations along their longitudinal axis. As a result of this, the system implies plates with at least two different geometries, each of which is complex, and tubes that have different and varying sections. This leads to disadvantages not only in fabrication (time and cost linked to the necessity of providing two types of fabrication), but also for maintenance (in particular for cleaning corrugated, bent and non-identical tubes).

Note also that this configuration with globally triangular tubes is more compact, and therefore heavier than that of prior art blocks with hexagonal tubes.

A common drawback of the various existing systems is that in practice they necessitate draining of the structures to install the blocks and to remove them.

IV—TECHNICAL PROBLEM AND SOLUTION OF THE INVENTION

An object of the invention is to alleviate the drawbacks cited above by proposing a module (of two plates) and a lamellar sedimentation system (with at least one block of plates) that combine at least some of the following advantages:

- sedimentation in tubes rather than between spaced plates, to improve the efficacy of sedimentation,
- use of a tube shape minimizing the area of the slats in contact with the flow of sludge, to diminish sludge-slat friction, increase the rate of flow of the sludge, minimize the section necessary for allowing free flow of sludge, and thereby increasing the available section for the flow of water,
- vertical disposition of the modules the corrugations whereof are inclined to improve their mechanical strength and/or to reduce the thickness of the plates,
- minimizing the number of different components to be provided,
- minimizing the number of plates to be assembled to constitute a module of given width but of great length,
- reducing the costs of use.

To this end the invention proposes, firstly, a lamellar sedimentation module including two plates fixed together, at least one of these plates having corrugations the crests and the troughs whereof are inclined to a first edge of this plate at a non-zero angle and delimit with the other plate inclined sedimentation tubes, characterized in that the two plates have the same corrugated profile and are fixed together in connecting areas defining a plane of symmetry for the tubes defined by these plates.

The identical corrugated profiles of the two plates enable them to be produced by the same fabrication process and their symmetrical assembly produces tubes in a particularly simple way.

The crests and the troughs are preferably of trapezoidal shape, so that the sedimentation tubes have a hexagonal shape, which corresponds to a structure that is both robust and not very compact.

To facilitate the positioning of the plates at the time of assembling the module, the plates are advantageously symmetrical to each other overall (and therefore identical), so that superposition of the edges of the plates, ignoring a rotation, guarantees the correct positioning of the troughs (or the crests).

For obvious reasons of simplicity of fabrication and handling, these plates are preferably rectangular in shape.

Likewise, for similar reasons of simplicity, the tubes are preferably rectilinear, without bends at their ends.

The inclination of the tubes relative to said first edge is advantageously in the range 45°-65°, preferably 55°-60°, which appears to lead to very good sedimentation performance when the plates are disposed vertically in the effluents to be treated, with the first edge disposed horizontally.

The invention further proposes a lamellar sedimentation system including at least one block formed of a plurality of plates, at least one pair of which constitutes a module of the type defined hereinabove, which imparts high stiffness to it.

A block of the above kind may include an odd number of plates but advantageously includes a plurality of modules of which at least two are modules assembled so that the modules conjointly delimit other tubes, the modules being fixed to each other in areas defining a plane of symmetry for those other tubes.

The other tubes advantageously have the same section as the tubes of the modules, in which case the block constitutes an array of identical tubes, which therefore has substantially homogeneous performance at all points in the block.

For obvious reasons of simplicity of fabrication, the modules are advantageously identical, which means in particular that a block has a rectangular parallelepiped shape, the plates being perpendicular to one of the faces of the block. The plates preferably extend perpendicularly to the smallest dimension of the block, in other words the plates extend along the largest two dimensions of the block, which encourages good mechanical strength of the assembly. A rectangular parallelepiped general shape of the above kind makes the block easy to manipulate and to accommodate in a sedimentation tank.

As already mentioned hereinabove, the block is advantageously disposed in the system so that the plates are vertical, with the first edge horizontal; this means in particular that the block may be suspended from a fixed portion of the system, with no risk of deformation of the block by gravity.

Note that in this configuration sedimentation occurs along a locally triangular portion (in a junction area between the two plates), which encourages rapid evacuation of the sludge.

The blocks are constructed by grouping a certain number of modules and each block may be provided with hooks or rings to facilitate handling it. The modules may be assembled to constitute a block by clipping, adhesive bonding, heat welding or ultrasound welding.

The blocks may optionally be installed inside metal frames that can also serve for transportation and handling. The frame may advantageously be demountable to enable easy replacement of the slats, according to the requirements of the treatment.

The disposition of the blocks in line with each other necessitates compliance with the same orientation of the sedimentation tubes in order to ensure that the end tubes of one of the blocks line up with the corresponding tubes of the other block; this yields tubes in two sections that end up having the same length as the tubes entirely contained within each block.

A modular structure is therefore obtained that adapts easily to the particular disposition of the tank that is to contain the lamellar sedimentation system, which tank may be of any size and any shape, including circular. This enables the construction of large assemblies by disposing the blocks in the treatment structures on supports provided for this purpose or suspending them from existing structures, entirely by mechanical handling means.

Where the block faces a tank wall to which the plates are perpendicular, the block is advantageously at a distance from that wall that leaves a space between the slats and the walls to ensure the feeding and the draining of the sedimentation tubes of the block that are incomplete.

The tubes preferably have a hydraulic diameter from 40 mm to 100 mm and/or the tubes preferably have a length from 15 to 30 times their hydraulic diameter, which ensures good sedimentation performance.

Note that, compared to the blocks of the document U.S. Pat. No. 5,384,178, the modules and blocks of the invention lead to a reduced weight for a given volume without degrading the mechanical strength of the assembly, with tubes of larger section, and therefore with a lower risk of clogging, since there are no approximately plane plates between plates with large corrugations. The disposition of the invention enables the use, for a given sedimentation task, of an area of plates much smaller than that proposed by the document cited above, the plane plates having no function in sedimentation as such.

Unlike crossed orderly linings, the parallel disposition of the corrugations (or waffle patterns) minimizes turbulence and prevents the formation of mixing roundabouts.

The present blocks significantly facilitate use and can even be installed in plant without emptying it or shutting it down.

V—DETAILED DESCRIPTION OF EMBODIMENTS OF THE INVENTION

Objects, characteristics and advantages of the invention emerge from the following description which is given by way of illustrative and nonlimiting example with reference to the appended drawings, in which.

Figure 2:
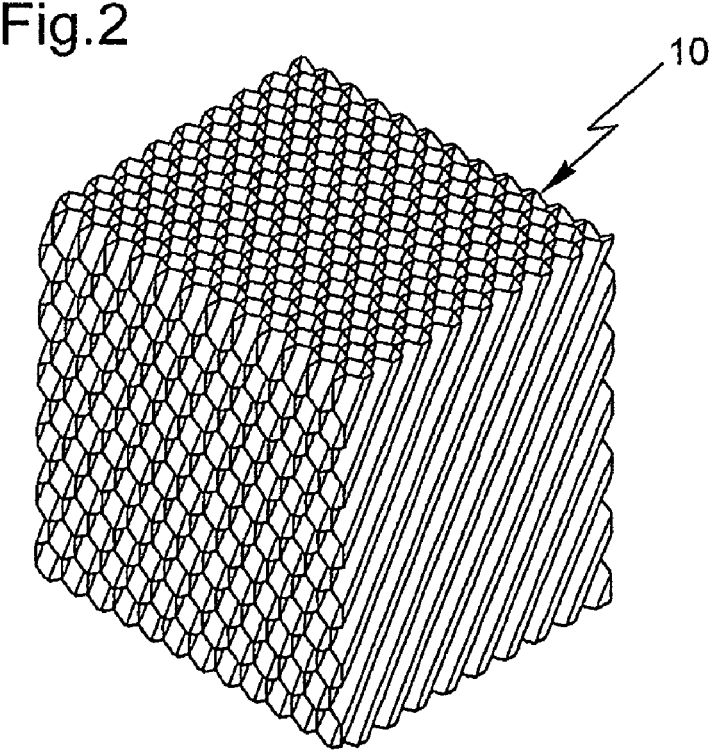
FIG. 2 shows a lamellar sedimentation block of the invention.
Figure 3:
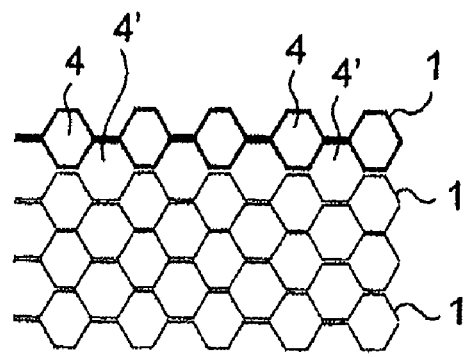
FIG. 3 is a partial top view of that block.
Figure 4:
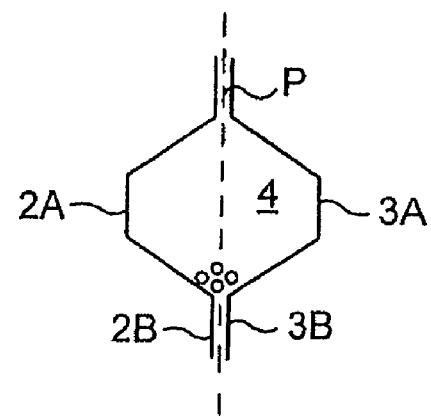
Figure 5:
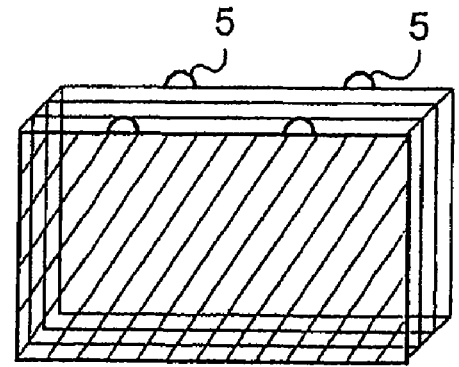
Figure 6:
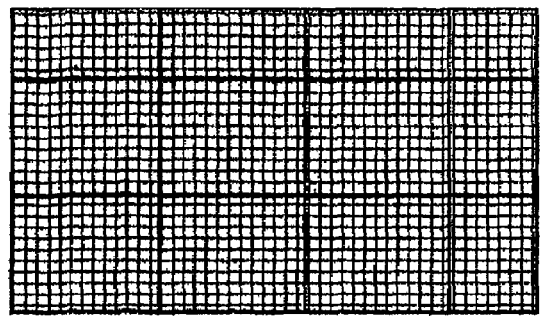
Figure 7:
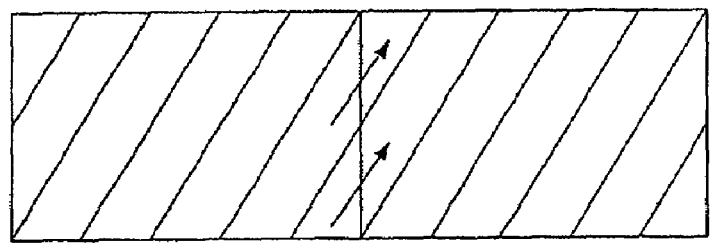
Figure 8:
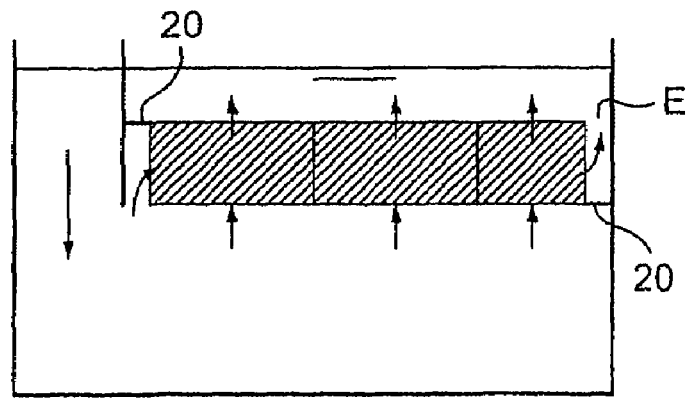
Figure 9:
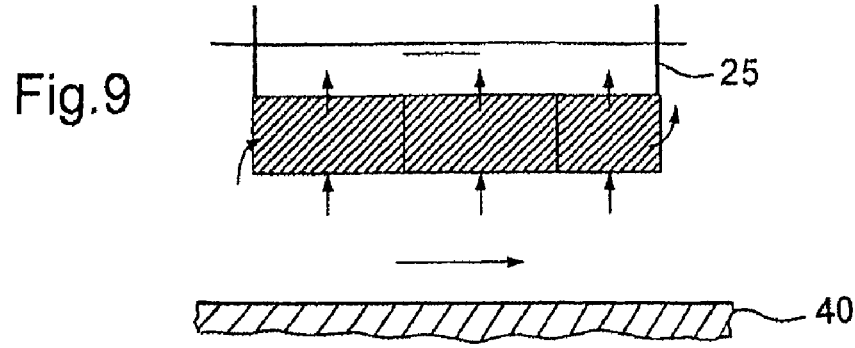
Figure 10:
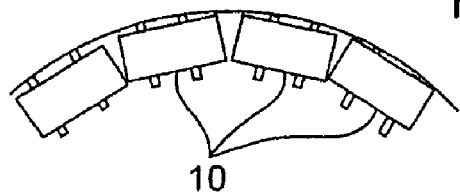
Figure 11:
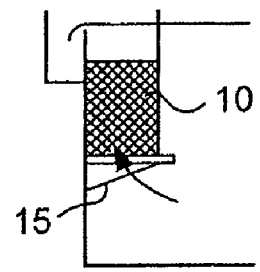
Figure 12:
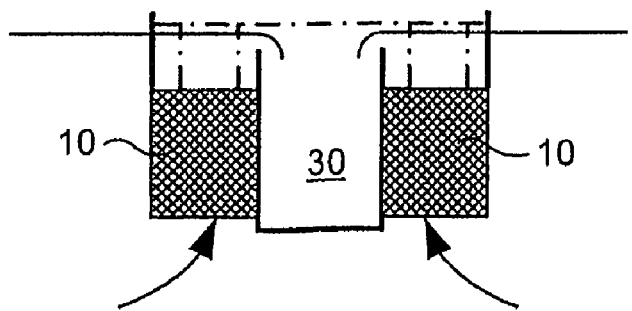

FIG. 4 is a detail view of a sedimentation tube in vertical section in a service configuration, FIG. 5 is a diagram of a block like that from FIGS. 2 and 3 fitted with attachment elements, FIG. 6 is a top view showing a set of complete or incomplete blocks occupying a predetermined rectangular space, FIG. 7 is a diagram showing the cooperation of two blocks situated in line with each other in the FIG. 6 system, FIG. 8 is a diagram of an installation including a sedimentation system resting on supports, FIG. 9 is a diagram of another installation including a sedimentation system integrated into a channel type activated sludge tank, FIG. 10 is a diagram of another installation including a series of sedimentation blocks disposed against a curved wall, FIG. 11 is a view of that installation in vertical section, and FIG. 12 is a diagram of a suspended installation.

Figure 1:
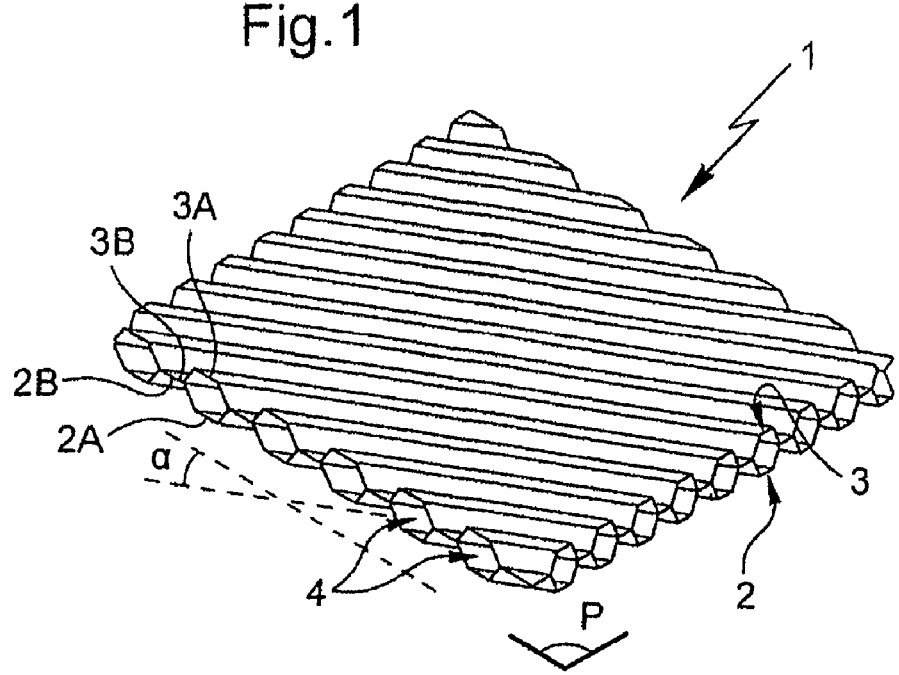
FIG. 1 is a perspective view of a lamellar sedimentation module.

FIG. 1 represents a sedimentation module of the invention.

The module 1 includes two plates 2 and 3 fixed together, for example adhesively bonded together.

These two plates include corrugations whose crests 2A or 3A and troughs 2B or 3B are inclined relative to a first edge of the plates at a non-zero angle α; the troughs are fixed facing each other, and the crests of the two plates delimit inclined sedimentation tubes 4.

The two plates have the same profile and are fixed in regions of their troughs that define an imaginary plane P that is a plane of symmetry of the tubes defined by the plates. Here the plates are identical in the sense that, in particular, their edges face each other; they are symmetrical to each other with respect to the plane P. Their shape is preferably rectangular, which is a particularly simple shape.

As shown in FIG. 2, a plurality of plates may be assembled to form a block 10, here of globally rectangular parallelepiped shape, with an array of identical hexagonal tubes. The FIG. 3 block may advantageously be analyzed as being formed of four modules 1 like that of FIG. 1, but the number of modules per block can of course be different. The troughs of the plates form tubes 4' which here are similar to those formed in each module.

Here the troughs and the crests have the same profile so that the tubes conjointly formed by the crests of two plates assembled face to face are identical to the tubes conjointly formed by the troughs of those plates with the troughs of each of the plates facing them.

The above lamellar sedimentation system is based on the V-sedimentation principle, using one of the corners of the hexagonal section inclined tube 4. The main advantage over the standard disposition in which sedimentation takes place on one of the sides of the hexagon is that there is a much smaller area of friction between sludge and walls, which reduces the friction forces that normally slow the downward movement of the sludge in the tube and therefore increases the rate of flow. The consequence of this is that, to evacuate the same volume of sludge, the layer thickness is less, increasing the section available for the flow of water, therefore a lower downward speed, and therefore more effective separation.

This is particularly clear from FIG. 4.

The tubular structure of the present blocks compared to plane plates is characterized by a greater hydraulic diameter, a lower Reynolds' number and a shorter distance for the establishing of laminar flow (NB: these concepts are familiar to the person skilled in the art, the hydraulic diameter being four times the hydraulic radius, for example, which is the ratio of the wetted section (the section occupied by the flow) to the wetted perimeter; these concepts are defined, for example in "Manuel d'Hydraulique Générale, Armando Lencaster, Editions Eyrolles 1986, p. 50. The consequence of this is a greater effective length than a plane plate sedimentation system, and thus a higher separation efficiency for exactly the same total length and separation.

The table below compares a block of the invention and a system with plane plates.

|  |  |  | Invention | Plane plates |
|---|---|---|---|---|
| Block width | mm | L | 1020 | 1020 |
| Tube width | mm | L1 | 60 | 1020 |
| Number of parallel tubes | — | N = L/L1 | 17 | 1 |
| Mean tube separation | mm | E | 30 | 30 |
| Wetted perimeter | mm | P1 | 166 | 2040 |
| Tube inside area | mm2 | S1 = L*E | 1800 | 30600 |
| Total inside area | mm2 | S = S1*N | 30600 | 30600 |
| Hydraulic diameter | mm | Dh = 4*S1/P1 | 43 | 60 |
| Kinematic viscosity | m/s2 | n | 1.15E−06 | 1.15E−06 |
| Flow speed | m/h | V | 10 | 10 |
| Reynolds number | — | Re = V*Dh/n | 105 | 145 |
| Transition length | mm | Lt = 0.02875*Dh*Re | 131 | 250 |
| Total length | mm | Lmax | 1100 | 1100 |
| Useful/total length |  | (Lmax − Lt)/Lmax | 88% | 77% |

The separation of the tubes, i.e. their hydraulic diameter, may be chosen as a function of the quantity of sludge to be extracted and the required exit concentration. The separation is preferably greater for highly charged effluents for which there is a high risk of clogging and, conversely, lower if it is required to increase the efficacy of treatment.

Thus the hydraulic diameter is preferably selected from 30 mm to 100 mm, preferably from approximately 40 mm for lightly charged effluents to approximately 80 mm for heavily charged effluents.

A number of remarks may be made regarding the blocks (certain of which have already been referred to above), remembering that these are preferred, not essential, features.

The rectangular sedimentation plates are preferably provided with channels or waffle patterns, for example formed by heat-forming; the term "waffle pattern" might seem more appropriate than the term "corrugation" when the section of the troughs or the crests is polygonal. The waffle patterns advantageously define an angle relative to the base from 45° to 65°, preferably from 55° to 60°. The height of the plates is typically from 500 mm to 3000 mm, preferably from 900 mm to 1300 mm.

The thermoformed channels are preferably of trapezoidal shape to create closed hexagonal shapes when the modules are constructed.

Each module consists of two parallel plates disposed in a mirror image arrangement relative to their plane of contact.

Each block consists of a predetermined number of modules disposed in parallel (although there could alternatively be an odd number of identical plates, successively mounted head-to-tail). The width B of each block depends on the number of associated modules and takes account of the width of the structure to be equipped, or even of the packaging method intended for transportation.

The blocks are of parallelepiped shape to facilitate installation in structures of all shapes and sizes; the last block of a row may be shortened to take account of the length of the structure to be equipped.

Each block may be equipped with hooks 5 (see FIG. 5), for example four hooks, to facilitate handling (picking up and putting down) during original installation or for washing or replacement. Here these hooks are disposed along upper edges of the outside two plates of the block. Note here that the plates extend along the greatest dimension of the block and that the width of the block (the depth in FIG. 5) is perpendicular to the plates.

The number of blocks to be disposed in parallel and their width are defined as a function of the width of the sedimentation tank.

A plurality of blocks may be juxtaposed in the longitudinal direction, as a function of the total length of the tank and the length of each block.

FIG. 6 shows an arrangement of 12 modules, including 2×3 complete modules (with dimensions L×B), three modules of reduced breadth (length L1 but breadth B1), three modules of reduced length (length L1 and breadth B) and a module with both dimensions reduced (length L1 and breadth B1). Note that the blocks are contiguous and that as a consequence of this the tubes of the blocks line up with each other (see FIG. 7).

Each plate is advantageously cut laterally always at the same point relative to the trapezoidal profile to ensure perfect continuity between two blocks disposed longitudinally. This ensures continuity of flow in the sedimentation tubes belonging to two successive blocks, preventing them from being clogged by deposited and non-evacuated sludge, which is indicated diagrammatically by the two arrows in FIG. 7 that cross the interface between the two adjacent blocks.

As emerges from FIG. 8 in particular, in a rectangular sedimentation system, vertical flow spaces E may advantageously be provided between the last block and the wall of the tank in order to ensure the use of all the sedimentation tubes and thereby avoid the formation of deposits in the tubes. Note that this rectangular sedimentation system is simply resting on supports 20.

In a rectangular sedimentation system like that of FIG. 8, horizontal plates (here represented by the same reference numbers as the supports 20) are disposed at the top or bottom of each vertical corridor in order to separate the untreated effluent from the effluent.

FIG. 9 represents a rectangular sedimentation system mounted in an activated sludge channel, here suspended (for example by means of the FIG. 5 hooks 5) from a fixed structure 25 above the water level but which may instead rest on supports. A apron 40 is shown.

FIG. 10 represents a circular sedimentation system equipped with a succession of blocks 10 mounted close to the wall, in front of the outlet weir (not shown); as seen in FIG. 11, each block rests on supports 15, for example.

FIG. 12 represents in section a sedimentation system including two blocks on each side of a rectilinear offtake channel 30 (here in a suspended configuration).

The invention claimed is:

1. Lamellar sedimentation module including two plates fixed together, at least one of these plates having corrugations the crests and the troughs whereof are inclined to a first edge of this plate at a non-zero angle and delimit with the other plate inclined sedimentation tubes, characterized in that the two plates (2, 3) have the same corrugated profile and are fixed together in connecting areas defining a plane of symmetry (P) for the tubes (4) defined by these plates.

2. Module according to claim 1, characterized in that the angle of inclination ($\alpha$) is in the range 45°-65°.

3. Module according to claim 2, characterized in that the angle of inclination is in the range 55°-60°.

4. Module according to claim 1, characterized in that the crests (2A, 3A) and the troughs (2B, 3B) are of trapezoidal shape so that the sedimentation tubes are of hexagonal shape.

5. Module according to claim 1, characterized in that the crests and the troughs have identical profiles.

6. Module according to claim 1, characterized in that the two plates are symmetrical to each other with respect to a plane of symmetry of the tubes.

7. Module according to claim 1, characterized in that the plates are identical to each other.

8. Module according to claim 1, characterized in that the plates are of rectangular shape.

9. Module according to claim 1, characterized in that the tubes are rectilinear throughout their length.

10. Lamellar sedimentation system including at least one block (10) formed of a plurality of plates at least one pair whereof constitute a module according to claim 1.

11. System according to claim 10, characterized in that the block (10) includes at least two modules assembled so that these modules conjointly delimit other tubes (4'), these modules being fixed together in areas defining a plane of symmetry for these other tubes.

12. System according to claim 11, characterized in that these other tubes (4') have the same section as the tubes (4) of each module.

13. System according to claim 10, characterized in that the at least one block contains blocks that are identical to each other.

14. System according to claim 10, characterized in that the block is of rectangular parallelepiped shape, the plates being parallel to one of the faces of this block.

15. System according to claim 14, characterized in that the plates are perpendicular to the smallest dimension of the block.

16. System according to claim 10, characterized in that the block is disposed so that the plates are vertical and the first edge is horizontal.

17. System according to claim 16, characterized in that the block is provided with attachment members by means whereof this block may be handled.

18. System according to claim 17, characterized in that the block is suspended from a fixed portion of the system.

19. System according to claim 10, characterized in that the block rests on a fixed portion of the system.

20. System according to claim 10, characterized in that it includes at least two juxtaposed identical blocks so that the tubes of one of the blocks are in line with the tubes of the other block.

21. System according to claim 10, characterized in that the block is disposed near a tank wall to which the plates are perpendicular, leaving a space between this block and this wall.

22. System according to claim 10, characterized in that the tubes have a hydraulic diameter from 40 mm to 100 mm.

23. System according to claim 10, characterized in that the tubes have a hydraulic diameter and a length from 15 to 30 times said hydraulic diameter.

24. A lamellar sedimentation module including two plates having a same corrugated profile with corrugations having crests and troughs included to a respective first edge of each one of the two plates at a non-zero angle so as to form inclined sedimentation tubes, the plates being fixed together in connecting areas defining a plane of symmetry for the sedimentation tubes.

25. A lamellar sedimentation system including at least one block formed of a plurality of plates wherein at least one pair of the plurality of plates having the same corrugated profile with corrugations having crests and troughs inclined to a respective first edge of each of the plates of the pair at a non-zero angle so as to form sedimentation tubes, the plates of the pair being fixed together in connecting areas defining a plane of symmetry for the tubes.

* * * * *